United States Patent
K A et al.

(10) Patent No.: US 11,483,242 B2
(45) Date of Patent: Oct. 25, 2022

(54) SEAMLESS END-TO-END SEGMENT ROUTING ACROSS METROPOLITAN AREA NETWORKS

(71) Applicant: Juniper Networks, Inc., Sunnyvale, CA (US)

(72) Inventors: Salih K A, Bengaluru (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 16/909,592

(22) Filed: Jun. 23, 2020

(65) Prior Publication Data

US 2021/0306265 A1     Sep. 30, 2021

Related U.S. Application Data (60) Provisional application No. 63/000,272, filed on Mar. 26, 2020.

(51) Int. Cl.
*H04L 45/745* (2022.01)
*H04L 45/02* (2022.01)
(Continued)

(52) U.S. Cl.
CPC ............ *H04L 45/745* (2013.01); *H04L 45/02* (2013.01); *H04L 45/04* (2013.01); *H04L 45/12* (2013.01); *H04L 45/507* (2013.01)

(58) Field of Classification Search
CPC combination set(s) only.
See application file for complete search history.

(56) References Cited

U.S. PATENT DOCUMENTS

2013/0322451 A1*  12/2013  Wang ............... H04L 45/50
                                                            370/392
2015/0109902 A1*   4/2015  Kumar ............. H04L 41/0668
                                                            370/219

(Continued)

FOREIGN PATENT DOCUMENTS

CN        105049350 A     11/2015
CN        108574634 A      9/2018
(Continued)

OTHER PUBLICATIONS

Extended Search Report from counterpart European Application No. 21163175.9, dated Aug. 24, 2021, 10 pp.
(Continued)

*Primary Examiner* — Xavier S Wong
(74) *Attorney, Agent, or Firm* — Shumaker & Sieffert, P.A.

(57) ABSTRACT

Techniques are described for providing end-to-end segment routing paths across metropolitan area networks. For example, a method comprises receiving, by an area border router (ABR) connected to one or more metropolitan area networks and a core network, a packet including a segment routing label stack including at least a label of the ABR, a context label associated with a routing instance of the ABR, and a subsequent label identifying a device in the segment routing path, determining, from a lookup of the context label in the metro routing table, a table next hop to the core routing table (or metro routing table); in response to determining the table next hop, determining, from a lookup of the subsequent label in the core routing table (or metro routing table), a next hop in the segment routing path; and sending, by the ABR, the packet toward the device in the segment routing path.

17 Claims, 6 Drawing Sheets

(51) Int. Cl.
  *H04L 45/12* (2022.01)
  *H04L 45/50* (2022.01)

(56) References Cited

U.S. PATENT DOCUMENTS

| | | | |
|---|---|---|---|
| 2015/0304206 A1* | 10/2015 | Filsfils | H04L 45/04 709/238 |
| 2018/0262440 A1 | 9/2018 | Sitaraman et al. | |
| 2019/0020738 A1 | 1/2019 | Paul et al. | |
| 2020/0389457 A1* | 12/2020 | Olofsson | H04L 45/566 |

FOREIGN PATENT DOCUMENTS

| | | |
|---|---|---|
| CN | 109257278 A | 1/2019 |
| WO | 2017/141078 A1 | 8/2017 |

OTHER PUBLICATIONS

Moy, "OSPF Version 2," Network Working Group, RFC 2328, Apr. 1998, 244 pp.
Filsfils et al., "Segment Routing Architecture," Internet Engineering Task Force (IETF), RFC 8402, Jul. 2018, 33 pp.
Callon, "Use of OSI IS-IS for Routing in TCP/IP and Dual Environments," Network Working Working Group, RFC 1195, Dec. 1990, 86 pp.
Previdi et al., "Source Packet Routing in Networking (SPRING) Problem Statement and Requirements," RFC 7855, Internet Engineering Task Force (IETF), May 2016, 19 pp.
Bashandy et al. "Segment Routing with the MPLS Data Plane" RFC 8660, Internet Engineering Task Force (IETF), Dec. 2019, 29 pp.
Aggarwal et al., "MPLS Upstream Label Assignment and Context-Specific Label Space," RFC 5331, Aug. 2008, 13 pp.
Rosen et al., "Multiprotocol Label Switching Architecture," RFC 3031, Network Working Group, Jan. 2001, 61 pp.
Coltun et al., "OSPF for IPv6," Network Working Group, RFC 5340, Jul. 2008, 95 pp.
Sheth et al., "OSPF Hybrid Broadcast and Point-to-Multipoint Interface Type," RFC 6845, Internet Engineering Task Force, IETF, Jan. 2013, 9 pp.
Oran, "OSI IS-IS Intra-domain Routing Protocol," RFC 1142, Network Working Group, Feb. 1990, 157 pp.
Ginsberg et al. "BGP—Link State (BGP-LS) Advertisement of IGP Traffic Engineering Performance Metric Extensions" RFC 8571, Internet Engineering Task Force (IETF), Mar. 2019, 10 pp.
Vasseur et al., "Path Computation Element (PCE) Communication Protocol (PCEP)," RFC 5440, Network Working Croup, Mar. 2009, 76 pp.
Enns et al., "Network Configuration Protocol (NETCONF)," RFC 6241, Internet Engineering Task Force, IETF, Jun. 2011, 113 pp.
Ginsberg et al. "IS-IS Extensions for Advertising Router Information" RFC 7981, Internet Engineering Task Force (IETF), Oct. 2016, 10 pp.
Lindem et al. "Extensions to OSPF for Advertising Optional Router Capabilities" RFC 7770, Internet Engineering Task Force (IETF), Feb. 2016, 15 pp.
Filsfils et al. "Segment Routing Use Cases" draft-filsfils-spring-segment-routing-use-cases-01. Network Working Group, Internet-Draft, Oct. 21, 2014, 35 pp.
Filsfils et al. "Segment Routing Policy Architecture" draft-ietf-spring-segment-routing-policy-06.txt, SPRING Working Group, Internet-Draft, Dec. 14, 2019, 35 pp.
Lindem et al. "OSPFv3 LSA Extendibility" draft-acee-ospfv3-lsa-extend.01.txt, IETF Trust, Network Working Group, Jul. 15, 2013, 27 pp.
Li et al. "IGP Requirements for Traffic Engineering with MPLS" draft-li-mpls-igp-te-00.txt, Network Working Group, Internet Draft, Feb. 1999, 6 pp.
Response to Extended Search Report dated Aug. 24, 2021, from counterpart European Application No. 21163175.9 filed Mar. 29, 2022, 32 pp.
Office Action, and translation thereof, from counterpart Chinese Application No. 2021102997289 dated Jul. 5, 2022, 14 pp.

* cited by examiner

SEAMLESS END-TO-END SEGMENT ROUTING ACROSS METROPOLITAN AREA NETWORKS

This application claims the benefit of U.S. Provisional Patent Application No. 63/000,272, filed Mar. 26, 2020, the entire content of which is incorporated herein by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices (otherwise referred to as nodes) within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques, such as by using a Source Packet Routing in Networking (SPRING) paradigm, that provides segment routing within an IGP domain to advertise single or multi-hop LSPs. SPRING includes multiple different label types including "adjacency" labels and "node" labels. To forward a packet through the network, the routers may push (and pop) one or more labels in a label stack, e.g., a segment list, that is applied to the packet as it is forwarded through the network.

SUMMARY

In general, this disclosure describes techniques for seamless end-to-end segment routing across metropolitan area networks. In some examples, an intermediate network, otherwise referred to as a "core" network, provides connectivity between metropolitan area networks (referred to herein as "metros"). In these examples, an area border router (ABR) provides one or more of the metros with access to the core network. As described herein, the ABR creates a routing instance for each metro connected to the ABR and defines a context label per routing instance. A routing instance for a first metro includes routing tables, such as a first routing table for routing traffic from the first metropolitan area network to the core network (referred to herein as "core routing table"), and a second routing table for routing traffic from the core network to the first metropolitan area network (referred to herein as "metro routing table"). Each of the routing tables may store a corresponding context label route for a respective routing instance. For example, in the core routing table, a context label route points to the metro routing table. In the metro routing table, the context label route points to the core routing table. The ABR then advertises the context label to other network devices, e.g., by using an IGP or Border Gateway Protocol (BGP).

In one example, a source device (e.g., provider edge (PE) device) of the first metropolitan area network connected to the ABR may send a packet along a segment routing path to reach a destination device of a second metropolitan area network reachable by the core network. In accordance with the techniques of this disclosure, the source device may apply a segment routing label stack including at least a label (e.g., node segment identifier (SID)) of the ABR, a context label of the routing instance for the first metropolitan area network, and a subsequent label identifying a core router (e.g., provider router or P router) of the core network. When the ABR receives the packet from the first metropolitan area network, the ABR may determine, based on a lookup of the context label route in the metro routing table, that the ABR is to perform a lookup of the subsequent label identifying the core router in the core routing table mapped to the context label in order to determine the route (e.g., next hop) to the core router.

In another example, the ABR may receive a packet from the core network destined for a device of one of the plurality of metropolitan area networks accessible by the ABR, such as a second metropolitan area network. In this example, a remote PE device of a remote metropolitan area network (or the core transit router of the core network) may apply a segment routing label stack including at least a node SID of the ABR, a context label of the routing instance for the second metropolitan area network, and a subsequent label identifying a device (e.g., PE device) of the second metropolitan area network. When the ABR receives the packet from the core network, the ABR may determine, based on a lookup of the context label route in the core routing table, a table next hop such that the ABR performs a lookup of the subsequent label identifying the PE device in the metro routing table mapped to the context label to determine a route to the PE device of the second metropolitan area network.

The techniques described herein may provide one or more technical advantages that realize a practical application. For example, by assigning a context label for each routing instance of each metropolitan area network connected to the ABR, network devices may use the context labels to generate end-to-end segment routing paths across metropolitan area networks, regardless of whether there are any conflicts between SIDs or prefixes assigned within the metropolitan area networks. In other words, the techniques described in this disclosure eliminate the need for different administrative organizations to reconfigure duplicate SIDs and/or prefixes and/or to maintain common spreadsheets of unique SIDs across the different administrative organizations.

In one example, this disclosure is directed to a method comprising receiving, by an area border router (ABR) connected to one or more metropolitan area networks and a core network, a packet including a segment routing label stack for a segment routing path, wherein the segment routing label stack includes at least a label of the ABR, a context label associated with a routing instance of the ABR, and a subsequent label identifying a device in the core network, wherein the routing instance of the ABR comprises a metropolitan area network routing table (metro routing table) for a first metropolitan area network of the one or more metropolitan area networks; determining, from a lookup of the context label in the metro routing table, a table next hop to a core routing table for the core network; in response to determining the table next hop, determining, from a lookup of the subsequent label in the core routing table, a next hop in the segment routing path to the device in the core network; and sending, by the ABR, the packet toward the device in the core network.

In another example, this disclosure is directed to a method comprising: receiving, by an area border router (ABR) connected to one or more metropolitan area networks and a core network, a packet including a segment routing label stack for a segment routing path, wherein the segment routing label stack includes at least a label of the ABR, a context label associated with a routing instance of the ABR, and a subsequent label identifying a device in a first metropolitan area network of the one or more metropolitan area networks, wherein the routing instance of the ABR comprises a metropolitan area network routing table (metro routing table) for the first metropolitan area network; determining, from a lookup of the context label in a core routing table for the core network, a table next hop to the metro routing table; determining, from a lookup of the subsequent label in the metro routing table, a next hop in the segment routing path to the device in the first metropolitan area network; and sending, by the ABR, the packet toward the device in the first metropolitan area network.

In a further example, this disclosure is directed to an area border router (ABR) connected to one or more metropolitan area networks and a core network, the ABR comprising: one or more processors operably coupled to a memory, wherein the one or more processors are configured to: receive a packet including a segment routing label stack for a segment routing path, wherein the segment routing label stack includes at least a label of the ABR, a context label associated with a routing instance of the ABR, and a subsequent label identifying a device in the core network, wherein the routing instance of the ABR comprises a metropolitan area network routing table (metro routing table) for a first metropolitan area network of the one or more metropolitan area networks; determine, from a lookup of the context label in the metro routing table, a table next hop to a core routing table for the core network; in response to determining the table next hop, determine, from a lookup of the subsequent label in the core routing table, a next hop in the segment routing path to the device in the core network; and send the packet toward the device in the core network.

The details of one or more examples are set forth in the accompanying drawings and the description below. Other features, objects, and advantages will be apparent from the description, drawings, and from the claims.

DETAILED DESCRIPTION

Figure 1:
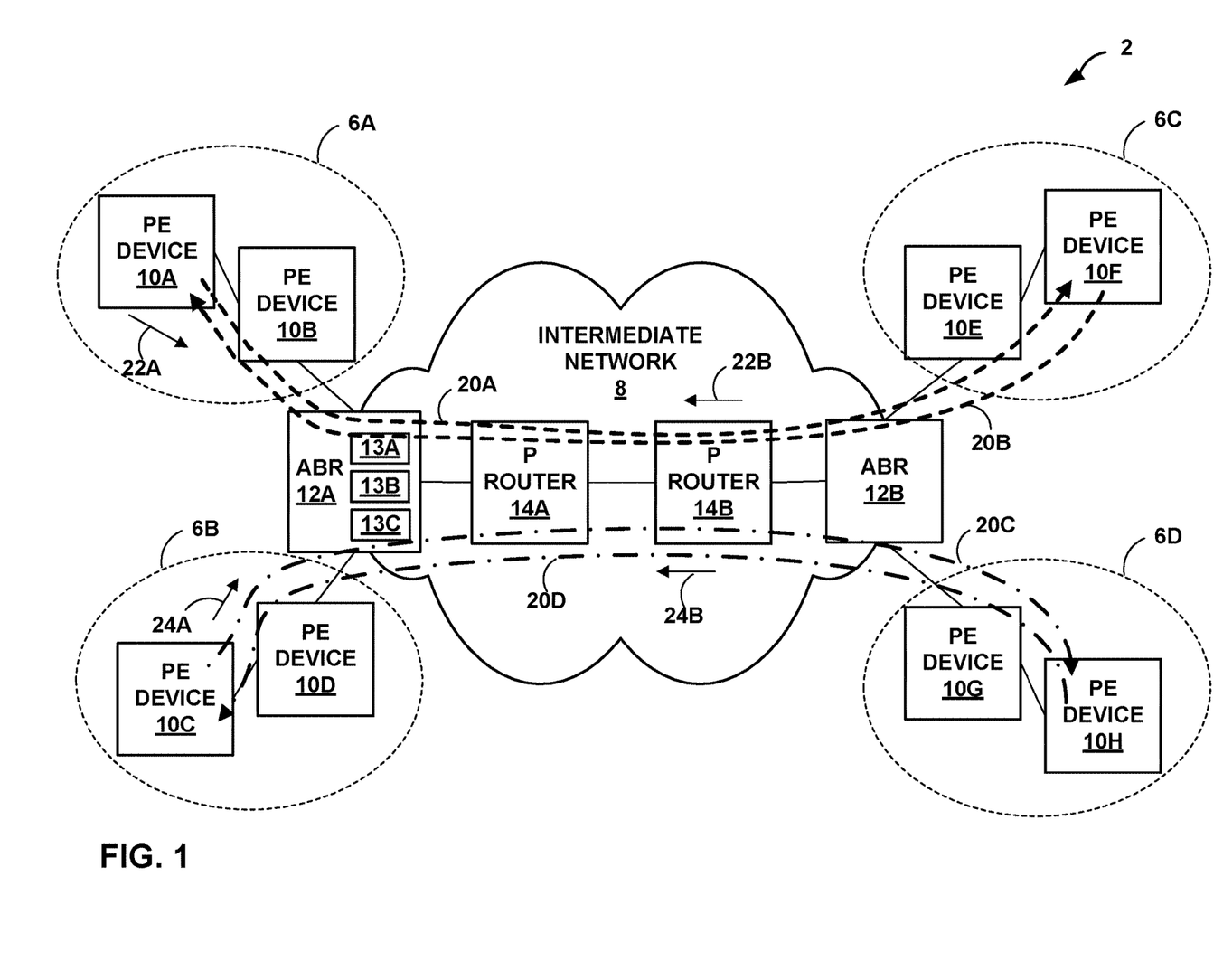
FIG. 1 is a block diagram illustrating an example network that provides seamless end-to-end segment routing across metropolitan area networks, in accordance with techniques described in this disclosure.

FIG. 1 is a block diagram illustrating an example network system 2 that provides seamless end-to-end segment routing across metropolitan area networks, in accordance with techniques described in this disclosure. Network system 2 includes metropolitan area networks 6A-6D (collectively, "metropolitan area networks 6" or simply "metros 6") interconnected via an intermediate network 8, which is referred to herein as a "core" or "backbone" network.

Intermediate network 8 may represent a service provider network that is owned and operated by a service provider, which is usually large telecommunications entity or corporation. Intermediate network 8 represents an L3 computer network, where reference to a layer followed by a number refers to a corresponding layer in the Open Systems Interconnection (OSI) model. Intermediate network 8 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Intermediate network 8 may be coupled to one or more networks administered by the provider of intermediate network 8 or other providers, and may thus form part of a large-scale public network infrastructure, e.g., the Internet.

Intermediate network 8 may provide computing devices within metropolitan area networks 6 with access to the Internet, and may allow the computing devices within the customer networks to communicate with each other.

Intermediate network 8 may implement Multi-Protocol Label Switching (MPLS) forwarding and in such instances may be referred to as an MPLS network or MPLS backbone. In the example of FIG. 1, intermediate network 8 includes one or more core transit routers (otherwise referred to as "provider (P) routers" or "core routers"), e.g., core routers 14A-14B, that provide devices of metropolitan area networks 6 with access to services provided by devices in the IP/MPLS intermediate network 8.

Each of metropolitan area networks 6 includes one or more provider edge (PE) devices, such as PE devices 10A-10H (collectively, "PE devices 10" or "PEs 10"), respectively. In some examples, PE devices 10 may represent routers, switches, aggregation devices (AD), or other types of network device capable of performing provider edge operations for metropolitan area networks 6.

PE devices 10 are configured to forward traffic using IGP-distributed labels. As shown in FIG. 1, each of PE devices 10 may be interconnected by one or more communication links that provide, as non-limiting examples, a 10- or 100-gigabit, physical connection. The communication links, generally, may be any wired or wireless links by which network packets travers between network devices. In the example network of FIG. 1, metro 6A includes PE devices 10A-10B, metro 6B includes PE devices 10C-10D, metro 6C includes PE devices 10E-10F, and metro 6D includes PE devices 10G-10H.

In the example of FIG. 1, some of PE devices 10 may be source devices that operate to ingress or otherwise inject or source network packets into metropolitan area networks 6. Some of PE devices 10 may be destination devices that operate to egress or otherwise drain network packets out of metropolitan area networks 6.

For example, PE device 10A may be coupled to one or more customer devices (not shown) with access to metro 6A and is configured to ingress packets received from the one or more customer devices into metro 6A. Similarly, PE device 10F may be coupled to one or more customer devices (not shown) with access to metro 6C and is configured to egress packets from metro 6C to the one or more customer devices.

Network system 2 also includes area border routers (ABRs) 12A-12B (collectively, "area border routers 12") that provide connectivity between metropolitan area networks 6 and intermediate network 8. In this example, ABR 12A provides connectivity between metros 6A and 6B and intermediate network 8. Similarly, ABR 12B provides connectivity between metros 6C and 6D and intermediate network 8.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, it should be understood that one or more additional network elements may be included along any of the illustrated links such that the network elements of network system 2 are not directly coupled.

PE devices 10 each maintain routing information that describes available routes through network system 2. Upon receiving an incoming packet, each of PE devices 10 examines information within the packet and forwards the packet in accordance with the routing information. In order to maintain an accurate representation of network system 2, PE devices 10 exchange routing information, e.g., bandwidth availability of links, in accordance with a defined routing protocol, such as an Interior Gateway Protocol (IGP). For example, each of the PE devices may use a link-state routing protocol, such as the Open Shortest Path First (OSPF) protocol or the Intermediate-System to Intermediate-System (IS-IS) protocol, to exchange link-state routing information to learn the topology of network system 2. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

In the example of FIG. 1, PE devices 10 may use segment routing techniques, e.g., the Source Packet Routing in Networking (SPRING) paradigm, within an IGP domain to advertise LSPs. Segment routing is a control-plane architecture that enables an ingress router to steer a packet through a specific set of nodes and links in a network. For example, segment routing techniques are used to configure labels for paths from an ingress router, e.g., PE device 10A to an egress router, e.g., PE device 10H. Segment routing within an IGP domain allows routers to advertise single or multi-hop LSPs within the IGP domain such as a segment routing LSP. In other words, segment routing may engage IGPs for advertising two types of network segments (e.g., tunnels). First, a one-hop tunnel that carries packets over a specific link between two nodes, irrespective of the link cost (hereafter shall be referred to as "adjacency segments"). Second, a multi-hop tunnel using shortest path links between two specific nodes or to a specific prefix (hereafter shall be referred to as "prefix segments").

For segment routing within prefix segments, the "path" information is disseminated between the routers as part of the IGP link state information for the domain. Network devices are able to steer packets through a controlled set of instructions, called segments, by prepending one or more segment identifiers (SIDs) (otherwise referred to as "labels") to the packets. In other words, an ingress network device can steer a packet through a desired set of nodes and/or links by prepending the packet with an appropriate combination of prefix SIDs (otherwise referred to as "node labels") and/or adjacency SIDs (otherwise referred to as "adjacency labels"), respectively. The combination of node labels and/or adjacency labels is referred to as a label stack or segment list. To forward a packet through a network, network devices that implement segment routing may push, pop, or swap one or more labels in a label stack that is applied to the packet as it is forwarded through the network. In this way, segment routing allows network devices to enforce a flow through any topological path and/or service chain while maintaining per-flow state only at the ingress node to the segment routing domain.

One potential advantage of segment routing may be that the segment routing architecture can be directly applied to the MPLS data plane with no change in the forwarding plane. A network administrator need only allocate SIDs to particular routers and the segment routing IGP control-plane automatically builds the required MPLS forwarding constructs from a router to any other router. Segment routing is further described in Filsfils, et al., "Segment Routing Architecture, IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft-draft-ietf-spring-segment-routing-policy06, Dec. 14, 2019; (2) Previdi, et al., "Source Packet Routing in Networking (SPRING) Problem Statement and Requirements," IETF RFC 7855, May 2016, and (3) Bashandy, et al., "Segment Routing with MPLS data plane," IETF RFC 8660, December 2019, each of which is incorporated herein by reference.

The different types of labels are further described hereinafter. An adjacency label may have a local semantic to a particular segment routing node, such as one of PE devices 10. In particular, an adjacency label steers traffic onto an adjacency (e.g., communication link and/or interface) or set of adjacencies. Thus, an adjacency label may be related to a particular network device. To use an adjacency label, a network device may initially assign the adjacency label to a particular adjacency and advertise the adjacency label to other network devices in the segment routing domain using the IS-IS protocol or the OSPF protocol. The router may be the only router in the segment routing domain to use the particular adjacency label. When a network device forwards a packet using the adjacency label, the network device may cause the packet to use the adjacency for the network device associated with the adjacency label. In this way, adjacency labels may be used to establish one-hop tunnels within the network.

A node label may have a global semantic within a segment routing domain. That is, each of PE devices 10 that implement segment routing may be assigned a defined node label range (commonly referred to as Segment Routing Global Bock (SRGB)) that is unique to each respective network device within the segment routing domain. An operator of network system 2 may ensure unique allocation of the different node label ranges from a global range to different routers. In addition to a node label range, each particular network device may also have a specific node identifier (e.g., node SID) that uniquely identifies the particular network device in the segment routing domain. Each respective router may advertise its respective node identifier and node label range to other routers in the segment routing domain using IS-IS or OSPF.

Based on routes determined using, e.g., shortest path routing, each of PE devices 10 may configure its forwarding state to push, pop, or swap node labels (corresponding to other nodes in the network) onto packets to forward such packets using the determined route to the destination. For instance, each of PE devices 10 may perform path selection using topology information learned by way of IGP to compute a shortest path within network system 2 on a hop-by-hop basis based on the routing information maintained by the routers. Each of PE devices 10 may then select a next hop along the locally computed shortest path and install forwarding information associated with the selected next hop in the forwarding plane of the network device, wherein the forwarding information identifies a network interface to be used when forwarding traffic and one or more labels to be applied when forwarding the traffic out the interface. The network devices use the next hops with the assigned labels to forward traffic hop-by-hop.

In some examples, network system 2 may be partitioned into a hierarchy of IGP levels, also referred to as "IGP areas." For instance, network system 2 may be configured into two areas: area 1 including PE devices 10 of one or more of metropolitan area networks 6, and area 2 including core routers of intermediate network 8. PE devices 10 route within area 1, whereas core routers of area 2 route between IGP areas. PE devices 10 of area 1 share intra-area routing information, and core routers of area 2 share inter-area information about IP addresses available within each area. All network devices within an area maintain a link-state database (LSDB) of all other network devices in the same area.

ABRs 12 provide traffic engineering between IGP areas. For example, ABR 12A may maintain separate link-state databases for each IGP area (e.g., area 1 and area 2) connected to ABR 12A. In some examples, metropolitan area networks connected to an ABR and within area 1 are managed by different administrative organizations. As one example, metro 6A is managed by a first administrative organization and metro 6B is managed by a second administrative organization. Typically, to interoperate between or merge together (e.g., acquire ownership of another metro for expansion) metros 6A and 6B, SIDs and prefixes of the metropolitan area networks must be globally unique. If there are any conflicts, the different administrative organizations typically reconfigure SIDs and prefixes of network devices of the metropolitan area networks manually. The different administrative organizations typically maintain common spreadsheets of unique SIDs across the different administrative organizations, which is operationally burdensome and prone to error.

In some examples, each of metropolitan area networks 6A and 6B may be configured as a separate routing instance at ABR 12A. For example, ABR 12A includes metro routing tables for routing within respective metropolitan area networks and a core routing table for routing within the core network. In these examples, each of the metropolitan area networks remain independent and routes across the routing tables are typically leaked at ABR 12A to enable end-to-end segment routing paths. However, in some examples, the SIDs and prefixes may conflict and cause traffic to loop. In these examples, the different administrative organizations must also manually reconfigure SIDs and prefixes of network devices of the metropolitan area networks if there are any conflicts and maintain common spreadsheets of unique SIDs across the different administrative organizations, which is operationally burdensome and prone to error.

In accordance with the techniques described in this disclosure, network system 2 provides seamless end-to-end segment routing across metropolitan area networks regardless of whether there are any conflicts (e.g., overlap) to the SIDs and prefixes of the metropolitan area networks. In the example of FIG. 1, when metropolitan area networks are connected to an ABR, the ABR creates a routing instance per metro and assigns a context label for each of the routing instances. A "context label" is, for example, an MPLS label that may identify a label table in which the label immediately below (e.g., subsequent to) the context label should be looked up. A context label carried as an outermost label over a particular multi-access subnet/tunnel should be unique within the scope of that subnet/tunnel. Further details regarding the context label are described in "MIMS Upstream Label Assignment and Context-Specific Label Space," RFC 5331, August 2008, the entire contents of which are incorporated by reference herein.

In the example of FIG. 1, when metro 6A is connected to ABR 12A, ABR 12A configures a routing instance for metro 6A and assigns a first context label for the routing instance for metro 6A. When metro 6B is connected to ABR 12A, ABR 12A configures a routing instance for metro 6B and assigns a second context label for the routing instance for metro 6B. Similarly, when metro 6C is connected to ABR 12B, ABR 12B configures a routing instance for metro 6C and assigns a third context label for the routing instance for metro 6C. When metro 6D is connected to ABR 12B, ABR 12B configures a routing instance for metro 6D and assigns a fourth context label for the routing instance for metro 6D.

The ABRs bind each of the context labels to a particular Forwarding Equivalence Class (FEC) for the segment routing path. In the example of FIG. 1, ABR 12A may include a core routing table 13A (e.g., mpls.0) for routing traffic received from one or more metropolitan area networks, e.g., metro 6A, to intermediate network 8 (also referred to herein as a "main routing table"), and a metro routing table 13B (e.g., metroA.mpls.0) for routing traffic received from intermediate network 8 to metro 6A. The core routing table 13A, mpls.0, includes a list of labels identifying next hop label-switched routers in the segment routing path, such as core routers 14 of intermediate network 8. The metro routing table 13B, metroA.mpls.0, includes a list of labels identifying next hop label-switched routers in the segment routing path within a metropolitan area network, such as PE devices 10 of metro 6A.

In each of routing tables 13A and 13B, ABR 12A configures routes for the first context label (referred to herein as "context label routes"). For example, in core routing table 13A, mpls.0, ABR 12A configures a context label route where the first context label is mapped to the metro routing table 13B (e.g., by using a routing instance identifier as a key), metroA.mpls.0, as a table next hop. In this way, when ABR 12A receives a packet including the first context label from intermediate network 8, the ABR 12A may perform a lookup of the first context label in core routing table 13A and determine that the ABR 12A is to perform a lookup of a subsequent label in the label stack in the metro routing table 13B. Similarly, in metro routing table 13B (e.g., metroA.mpls.0), ABR 12A configures a context label route where the first context label is mapped to the core routing table 13A (e.g., mpls.0), as a table next hop. In this way, when ABR 12A receives a packet including the first context label from metro 6A, ABR 12A may perform a lookup in metro routing table 13B and determine, based on the first context label, that the ABR 12A is to perform a lookup of a subsequent label in the label stack in core routing table 13A.

Similarly, for metro 6B, ABR 12A may include metro routing table 13C (e.g., metroB.mpls.0) for routing traffic received from intermediate network 8 to metro 6B. ABR 12A also uses core routing table 13A (e.g., mpls.0) for routing traffic received from metro 6B to intermediate network 8. In each of routing tables 13A and 13C, ABR 12A configures routes for the second context label. For example, in the core routing table 13A (e.g., mpls.0), ABR 12A configures a context label route where the second context label is mapped to the metro routing table 13C (e.g., metroB.mpls.0), as a table next hop. In this way, when ABR 12A receives a packet including the second context label from intermediate network 8, the ABR 12A may perform a lookup of the second context label in core routing table 13A and determine that the ABR 12A is to perform a lookup of a subsequent label in the label stack in metro routing table 13C. Similarly, in the metro routing table (e.g., metroB.mpls.0), ABR 12A configures a route where the second context label is mapped to the core routing table 13A (e.g., mpls.0), as a table next hop. In this way, when ABR 12A receives a packet including the second context label from metro 6B, the ABR 12A may perform a lookup in metro routing table 13C and determine, based on the second context label, that ABR 12A is to perform a lookup of a subsequent label in the label stack in core routing table 13A. Additional information on downstream-assigned label bindings is described in E. Rosen, "Multiprotocol Label Switching Architecture," Network Working Group, RFC 3031, January 2001, the entire contents of which are incorporated by reference herein.

ABR 12A advertises the context labels to neighboring network devices of network system 2, such as PE devices 10 of metros 6 and/or core routers 14 of intermediate network 8. As one example, ABR 12A may specify a context label within a sub-Type, Length, and Value (TLV) of an Intermediate System-Intermediate System (IS-IS) message. In another example, ABR 12A may specify a context label within a TLV of an Open Shortest Path First (OSPF) message. In yet another example, ABR 12A may specify a context label within a TLV of a Border Gateway Protocol Link State (BGP-LS) message, which may be configured similarly to a sub-TLV of an IS-IS message, to advertise the context label to a controller.

Network devices, such as PE devices 10, may encapsulate a packet with a segment routing label stack including a context label to forward the packet along an end-to-end segment routing path, e.g., segment routing paths 20A-20D (collectively, "segment routing paths 20"). As one example, when PE device 10A of metro 6A receives a packet from a customer network (not shown) and destined for a customer network connected to metro 6C, PE device 10A may encapsulate the packet with a segment routing label stack for segment routing path 20A including at least a node SID of ABR 12A, the first context label associated with metro 6A, and a subsequent label identifying a core router (e.g., node SID of P router 14B) of intermediate network 8. The encapsulated packet is illustrated in FIG. 1 as "packet 22A." Similarly, when a remote PE device, e.g., PE device 10F of metro 6C, receives a packet from a customer network (not shown) and destined for a customer network connected to metro 6A, PE device 10F may encapsulate the packet with a segment routing label stack for segment routing path 20B including at least a node SID of ABR 12A, the first context label associated with metro 6A, and a subsequent label identifying a PE device (e.g., node SID of PE device 10A) of metro 6A. The encapsulated packet is illustrated in FIG. 1 as "packet 22B." In some examples, the segment routing label stack may include a segment identifier ("N") of a particular metro to direct the packet to a particular metropolitan area network. In this example, the segment identifier, N, for packet 22A may identify a segment within metro 6C, and/or the segment identifier, N, for packet 22B may identify a segment within metro 6A.

An example operation of ABR 12A is described below with respect to segment routing paths 20A and 20B. In response to receiving packet 22A from metro 6A based on the node SID of ABR 12A being the top label of the segment routing label stack of packet 22A, ABR 12A may perform a lookup of a subsequent label of the segment routing label stack, i.e., the first context label, in metro routing table 13B (e.g., metroA.mpls.0) to determine whether the first context label matches an entry in metro routing table 13B. In this example, ABR 12A may determine that the first context label matches the context label route with a table next hop to core routing table 13A. ABR 12A then performs a lookup of a subsequent label of the segment routing label stack, e.g., a node SID of a core router within intermediate network 8, in the core routing table 13A to determine the next hop in segment routing path 20A to the core router, e.g., P router 14B.

In the reverse direction, when ABR 12A receives packet 22B from intermediate network 8 based on the node SID of ABR 12A being the top label of the segment routing label stack of packet 22B, ABR 12A may perform a lookup of a subsequent label of the segment routing label stack, i.e., the first context label, in core routing table 13A (e.g., mpls.0) to determine whether the first context label matches an entry in core routing table 13A. In this example, ABR 12A may determine that the first context label matches the context label route with a table next hop to metro routing table 13B (e.g., metroA.mpls.0). ABR 12A then performs a lookup of a subsequent label of the segment routing label stack, e.g., a node SID of PE device 10A, in the metro routing table 13B to determine the next hop in segment routing path 20B to PE device 10A.

In another example, ABR 12A configures a context label of the routing instance for a second metropolitan area network, e.g., metro 6B. In this example, when PE device 10C of metro 6B receives a packet from a customer network (not shown) and destined for a customer network connected to metro 6D, PE device 10C may encapsulate the packet with a segment routing label stack for segment routing path 20C including at least a node SID of ABR 12A, the first context label associated with metro 6B, and a subsequent label identifying a core router (e.g., node SID of P router 14B) of intermediate network 8. The encapsulated packet is illustrated in FIG. 1 as "packet 24A." Similarly, when a remote PE device, e.g., PE device 10H of metro 6D, receives a packet from a customer network (not shown) and destined for a customer network connected to metro 6B, PE device 10H may encapsulate the packet with a segment routing label stack for segment routing path 20D including at least a node SID of ABR 12A, the first context label associated with metro 6B, and a subsequent label identifying a PE device (e.g., node SID of PE device 10C) of metro 6B. The encapsulated packet is illustrated in FIG. 1 as "packet 24B." In some examples, the segment routing label stack may include a segment identifier, N, of a particular metro to direct the packet to a particular metropolitan area network. In this example, the segment identifier, N, for packet 24A may identify a segment within metro 6D, and/or the segment identifier, N, for packet 24B may identify a segment within metro 6B.

An example operation of ABR 12A is described below with respect to segment routing paths 20C and 20D. In response to receiving packet 24A from metro 6B based on the node SID of ABR 12A being the top label of the segment routing label stack of packet 24A, ABR 12A may perform a lookup of a subsequent label of the segment routing label stack, i.e., the second context label, in metro routing table 13C (e.g., metroB.mpls.0) to determine whether the second context label matches an entry in metro routing table 13C. In this example, ABR 12A may determine that the second context label matches the context label route with a table next hop to core routing table 13A (e.g., mpls.0). ABR 12A then performs a lookup of a subsequent label of the segment routing label stack, e.g., a node SID of P router 14B, in the core routing table 13A to determine the next hop in segment routing path 20B to P router 14B within intermediate network 8.

In the reverse direction, when ABR 12A receives packet 24B from intermediate network 8 based on the node SID of ABR 12A being the top label of the segment routing label stack of packet 24B, ABR 12A may perform a lookup of the subsequent label of the segment routing label stack, i.e., the second context label, in core routing table 13A (e.g., mpls.0) to determine whether the second context label matches an entry in core routing table 13A. In this example, ABR 12A may determine that the second context label matches the context label route with a table next hop to metro routing table 13C (e.g., metroB.mpls.0). ABR 12A then performs a lookup of a subsequent label of the segment routing label stack, e.g., a node SID of PE device 10C in the metro routing table 13C to determine the next hop in segment routing path 20D to PE device 10C.

In some examples, a controller (e.g., Software Defined Networking (SDN) controller) (not shown in FIG. 1) may obtain the context label from ABRs and use the context labels (along with the SIDs and prefixes of network devices in network system 2) to generate end-to-end segment routing paths. In these examples, the controller may use, for example, BGP-LS to obtain context labels from ABRs 12.

The techniques described herein may provide one or more technical advantages that realize a practical application. For example, by assigning a context label for each routing instance of each metropolitan area network connected to the ABR, network devices may use the context labels to generate end-to-end segment routing paths across metropolitan area networks, regardless of whether there are any conflicts between SIDs or prefixes assigned within the metropolitan area networks. In other words, the techniques described in this disclosure eliminate the need for different administrative organizations to reconfigure duplicate SIDs and/or prefixes and/or to maintain common spreadsheets of unique SIDs across the different administrative organizations.

Figure 2:
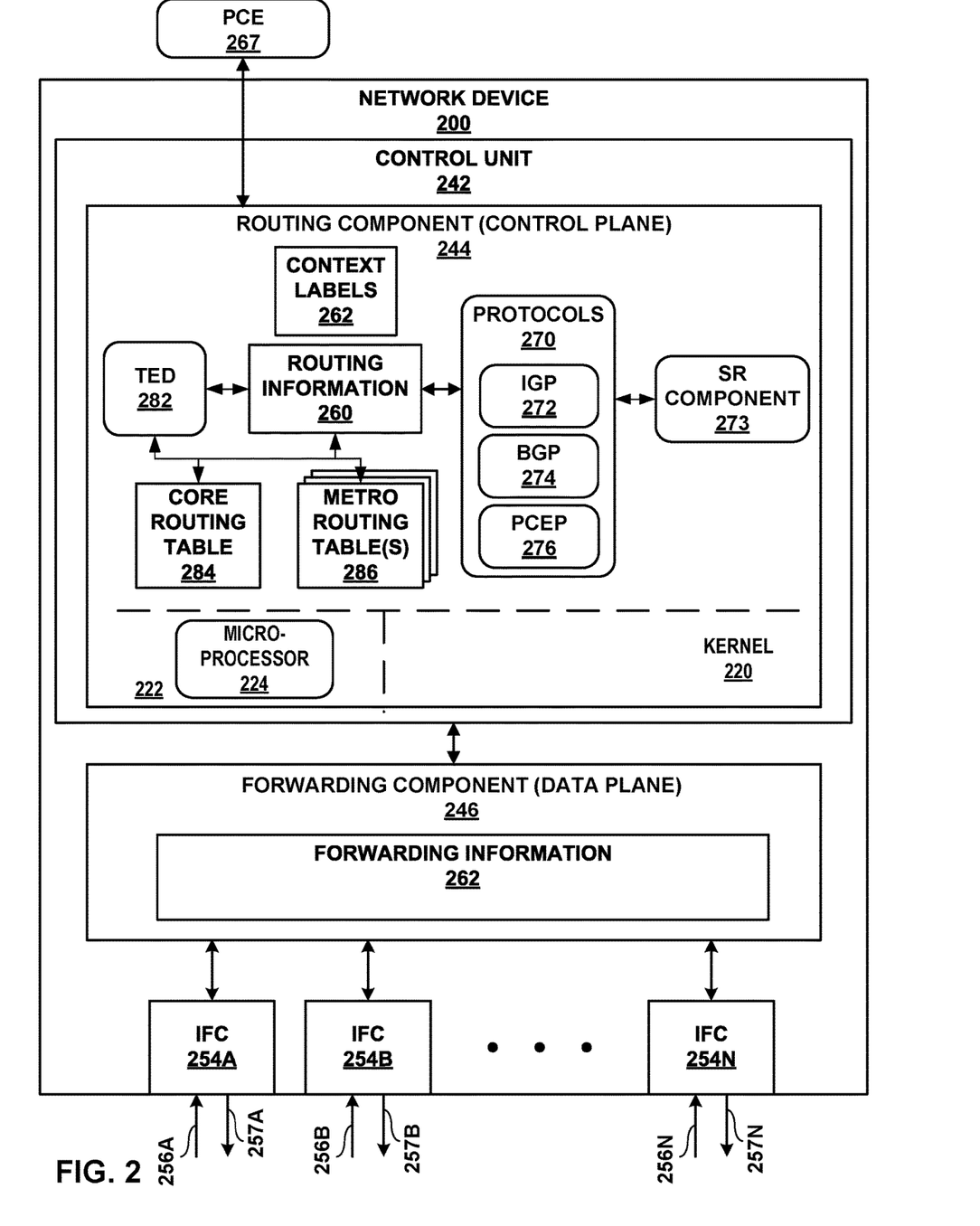
FIG. 2 is a block diagram illustrating an example area border router (ABR) configured to operate in accordance with the techniques described in this disclosure.

FIG. 2 is a block diagram illustrating an example network device 200 that performs various aspects of the techniques described in this disclosure. Network device 200 may represent any of ABRs 12, but may also represent any of PE devices 10 of FIG. 1. While described with respect to network device 200, the techniques may be implemented by any other type of network device capable of implementing at least routing protocols including IGPs for use in segment routing. Thus, while described with respect to network device 200, the techniques should not be limited to network device 200 described with respect to the example of FIG. 2.

In the example of FIG. 2, network device 200 includes interface cards 254A-254N ("IFCs 254") that receive packets via inbound links 256A-256N ("inbound links 256") and send packets via outbound links 257A-257N ("outbound links 257"). IFCs 254 are typically coupled to links 256, 257 via a number of interface ports (not shown). Inbound links 256 and outbound links 257 may represent physical interfaces, logical interfaces, or some combination thereof.

In general, network device 200 may include a control unit 242 that determines routes of received packets and forwards the packets accordingly via IFCs 254. In the example of FIG. 2, control unit 242 includes routing component 244 (control plane) that configures and controls packet forwarding operations applied by forwarding component 246 (data plane).

Elements of control unit 242 and forwarding component 246 may be implemented solely in software, or hardware, or may be implemented as combinations of software, hardware, or firmware. For example, control unit 242 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 242 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols, processes, and modules. Control unit 242, in some examples, retrieves and executes the instructions from memory for these aspects.

Routing component 244 is responsible for the maintenance of routing information 260 to reflect the current topology of a network and other network entities to which network device 300 is connected. In particular, routing protocols periodically update routing information 340 to reflect the current topology of the network and other entities based on routing protocol messages received by network device 300.

Routing component 244 provides an operating environment for execution of various routing protocols 270 that may comprise software processes having instructions executed by a computing environment. Routing component 244 is responsible for the maintenance of routing information 260 (e.g., a routing information base) to reflect the current topology of a network and other network entities to which network device 200 is connected. In particular, routing protocols periodically update routing information 260 to accurately reflect the topology of the network and other entities based on routing protocol messages received by network device 200. The protocols may be software processes executing on one or more processors. For example, routing component 244 includes network protocols that operate at a network layer of the network stack, which are typically implemented as executable software instructions.

In the example of FIG. 2, protocols 270 may include IGP component 272 to implement an IGP protocol to exchange link state information within a given IGP area, and facilitate forwarding of packets or other data units between endpoint devices within the IGP area. In some examples, IGP component 272 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt. In some examples, IGP component 272 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990. IGP component 272 may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt. In some examples, router 200 may include both an OSPF component and an IS-IS component.

In some examples, protocols 270 may include BGP component 274 to implement a BGP protocol to exchange link state information between or across IGP areas or domains. For example, BGP component 274 may include BGP-LS in accordance with RFC 8571, by L. Ginsberg, Ed., et al., entitled "BGP-Link State (BGP-LS) Advertisement of IGP Traffic Engineering Performance Metric Extensions," dated March 2019, the entire contents of which is incorporated by reference herein. In some examples, network device 200 may use BGP component 274 to establish a BGP session or a BGP link state (BGP-LS) session with a controller such that the controller may obtain context labels.

Protocols 270 may also include configuration protocols. For example, protocols 270 may include PCEP 276 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples, PCE 267 or central controller (e.g., SDN controller) may configure network device 200 with SIDs via PCEP 276 or a NETCONF component (not shown). Protocols 270 may include other routing protocols (not shown), such as label distribution protocol (LDP), resource reservation protocol with traffic engineering extensions (RSVP-TE), routing information protocol (RIP), or other network protocols.

Routing component 244 includes a segment routing (SR) component 273 to implement segment routing techniques for IGP protocols (e.g., IS-IS and OSPF) for specifying how network device 200 may advertise node or adjacency labels. As described above, segment routing techniques may include the SPRING paradigm. As described in FIG. 1, these node or adjacency labels may steer a packet through a controlled set of instructions, called segments, by prepending the packet with a segment routing header.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 may include a Traffic Engineering Database (TED) 282 for storing e.g., traffic engineering information (e.g., link metrics) learned for the full network topology. In some examples, TED 282 or a separate link state database (LSDB) may include segment identifier information, such as node SIDs and adjacency SIDs, included in the topology. TED 282 may be in the form of a variety of data structures, such as a number of tables, link lists, radix trees, databases, flat files, or other data structures.

In accordance with the techniques described herein, routing component 244 further includes a core routing table 284 for routing traffic received from metropolitan area networks to an intermediate network, and one or more metro routing tables 286 for routing traffic received from the intermediate network to corresponding metropolitan area networks. Core routing table 284 may represent an example implementation of core routing table 13A of FIG. 1. Core routing table 284 may store IP addresses of next hops (e.g., core routers) along a segment routing path. Metro routing tables 286 may represent an example implementation of metro routing tables 13B and 13C of FIG. 1. Metro routing tables 286 may each store IP addresses of next hops (e.g., network devices) in metropolitan area networks.

Routing component 244 includes kernel 220, which provides a run-time operating environment for user-level processes. Kernel 220 may represent, for example, a UNIX operating system derivative such as Linux or Berkeley Software Distribution (BSD). Kernel 220 offers libraries and drivers by which user-level processes may interact with the underlying system. Hardware environment 222 of routing component 244 includes microprocessor 224 that executes program instructions loaded into a main memory (not shown in FIG. 2) from a storage device (also not shown in FIG. 2) in order to execute the software stack, including both kernel 220 and processes executing on the operating environment provided by kernel 220. Microprocessor 224 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 220 provides an operating environment that executes various protocols 270 (e.g., IGP 272 and segment routing techniques for IGP) to generate forwarding information, e.g., forwarding information 262, based on the network topology stored in routing information 260.

Forwarding component 262 represents hardware and logic functions that provide high-speed forwarding of network traffic. Forwarding component 262 typically includes a set of one or more forwarding chips programmed with forwarding information that maps network destinations with specific next hops and the corresponding output interface ports. In general, when network device 200 receives a packet via one of inbound links 256, forwarding component 262 identifies an associated next hop for the data packet by traversing the programmed forwarding information based on information within the packet. Forwarding component 262 forwards the packet on one of outbound links 257 mapped to the corresponding next hop, such as a tunneling endpoint or a network device in a local customer network.

In the example of FIG. 2, forwarding component 262 includes forwarding information 262. In accordance with routing information 260, forwarding component 262 stores forwarding information 262 that maps packet field values to network destinations with specific next hops and corresponding outbound interface ports. For example, routing component 244 analyzes routing information 260 and generates forwarding information 262 in accordance with routing information 260. Forwarding information 262 may be maintained in the form of one or more tables, link lists, radix trees, databases, flat files, or any other data structures.

In accordance with the techniques described in this disclosure, control unit 242 may be configured to perform seamless end-to-end segment routing across metropolitan area networks as described elsewhere in this disclosure. Assume for example network device 200 represents an implementation of ABR 12A of FIG. 1. In this example, routing component 244 includes a data structure to store context labels generated for each routing instance per metropolitan area network (illustrated in FIG. 3 as "context labels 262") that is connected to network device 200, such as metros 6A and 6B.

Core routing table 284 and metro routing tables 286 are each configured with routes for each context label in context labels 262. For example, core routing table 284 is configured with a context label route where a context label associated with metro is mapped to a corresponding metro routing table (e.g., by using a routing instance identifier as a key), as a table next hop. In this way, when network device 200 receives a packet including the context label via an interface connected to intermediate network 8, network device 200 may perform a lookup in core routing table 284 and determine, based on the context label, that network device 200 is to perform a lookup in the corresponding metro routing table 286. Similarly, one of metro routing tables 286 is configured with a context label route where the context label is mapped to core routing table 284, as a table next hop. In this way, when network device 200 receives a packet including the context label via an interface connected to metro 6A, network device 200 may perform a lookup in the corresponding metro routing table 286 and determine, based on the context label, that network device 200 is to perform a lookup in core routing table 284.

Routing component 244 may advertise the context labels 262 using one or more of protocols 270, such as IGP 272 and/or BGP 276. In this way, network devices may encapsulate packets with a segment routing label stack including at least a node SID of network device 200, a respective context label of the context labels 262, and a subsequent label identifying a device in the core network or metropolitan area network the network device 200 is to forward the packet, which is then used by network device 200 to perform a lookup of the subsequent label of the segment routing label stack in core routing table 284 and/or metro routing tables 286.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

The architecture of network device 200 illustrated in FIG. 2 is shown for example purposes only. The techniques of this disclosure are not limited to this architecture. In other examples, network device 200 may be configured in a variety of ways. In one example, some of the functionally of control unit 242 may be distributed within IFCs 254. In another example, control unit 242 may comprise a plurality of packet forwarding components operated as slave routers.

Figure 3A:
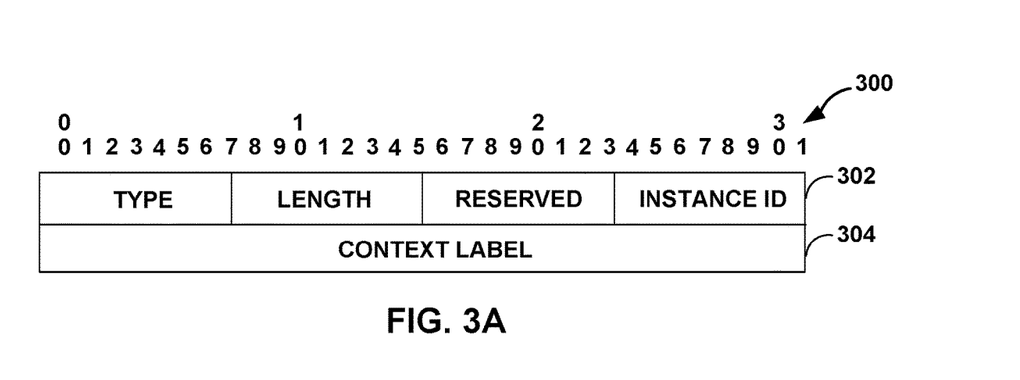
FIGS. 3A-3B are block diagrams illustrating example routes including a context label, in accordance with the techniques described in this disclosure.

FIGS. 3A-3B are conceptual diagrams illustrating example route advertisement messages including a context label, in accordance with the techniques described in this disclosure. In the example of FIG. 3A, route advertisement message 300 may include a context label field 304 for a particular routing instance identified by instance ID 302. Route advertisement message 300, in some examples, may represent a sub-Type, Length, and Value (TLV) of an IS-IS message as described in L. Ginsberg, et al., "IS-IS Extensions for Advertising Routing Information," RFC 7981, October 2016, the entire contents of which is incorporated by reference herein.

Route advertisement message 300 may include, among other things, fields including: (1) a type field of the sub-TLV, (2) a length field of the sub-TLV, (3) reserved field of the sub-TLV, (4) an instance identifier of the particular routing instance 302, and/or (5) a context label field 304. In some examples, the context label field 304 may be a 32-bit integer indicating the context label with which other devices may encapsulate with a packet to cause the ABR to perform a lookup of the context label in a routing table.

Figure 3B:
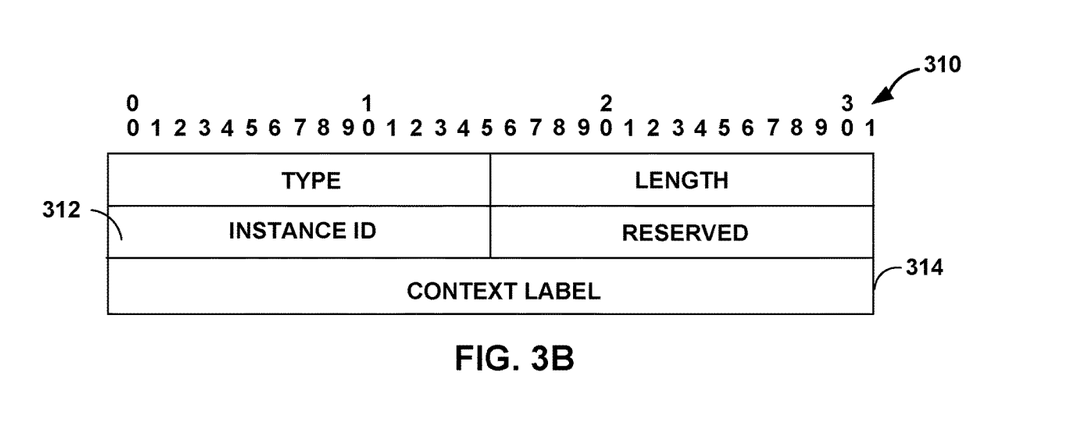

In the example of FIG. 3B, route advertisement message 310 may include a context label field 314 for a particular routing instance identified by instance ID 312. Route advertisement message 310, in some examples, may represent a TLV of an OSPF message as described in A. Lindem, Ed., et al., "Extensions to OSPF for Advertising Optional Router Capabilities, RFC 7770, February 2016, the entire contents of which is incorporated by reference herein.

Route advertisement message 310 may include, among other things, fields including: (1) a type field of the TLV, (2) a length field of the TLV, (3) reserved field of the TLV, (4) an instance identifier of the particular routing instance 312, and/or (5) a context label field 314. In some examples, the context label field 314 may be a 32-bit integer indicating the context label with which other devices may encapsulate with a packet to cause the ABR to perform a lookup of the context label in a routing table.

Figure 4A:
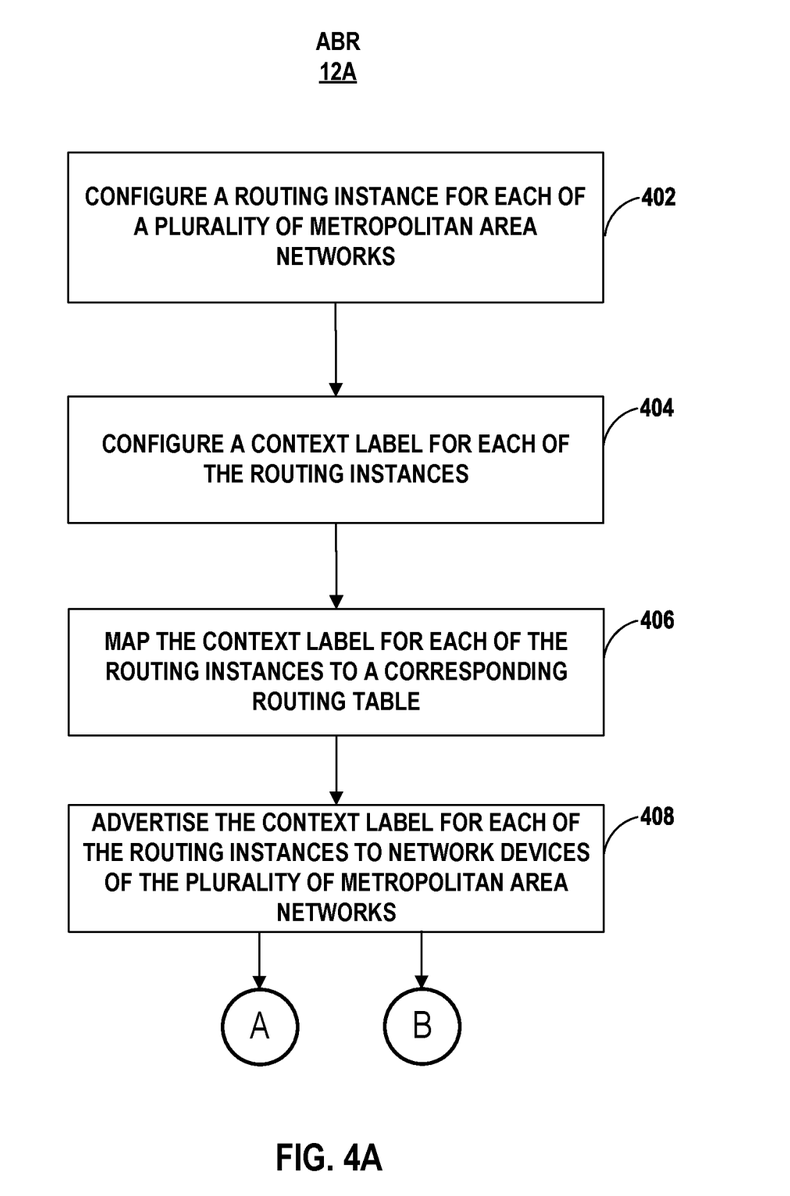
FIGS. 4A-4C are flowcharts illustrating example operations of network devices in a network to provide an end-to-end segment routing path across metropolitan area networks, in accordance with the techniques described in this disclosure.
Figure 4B:
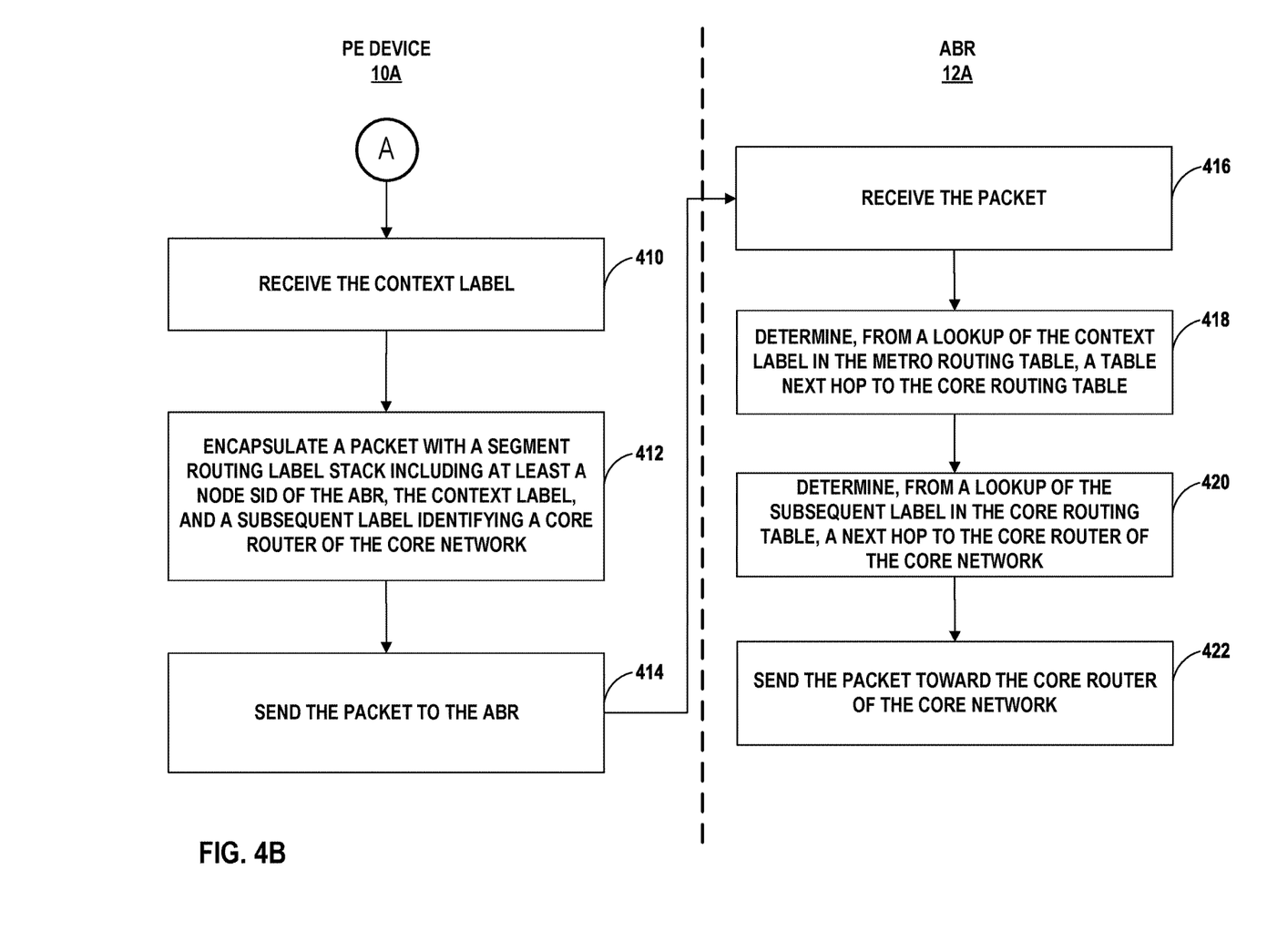
Figure 4C:
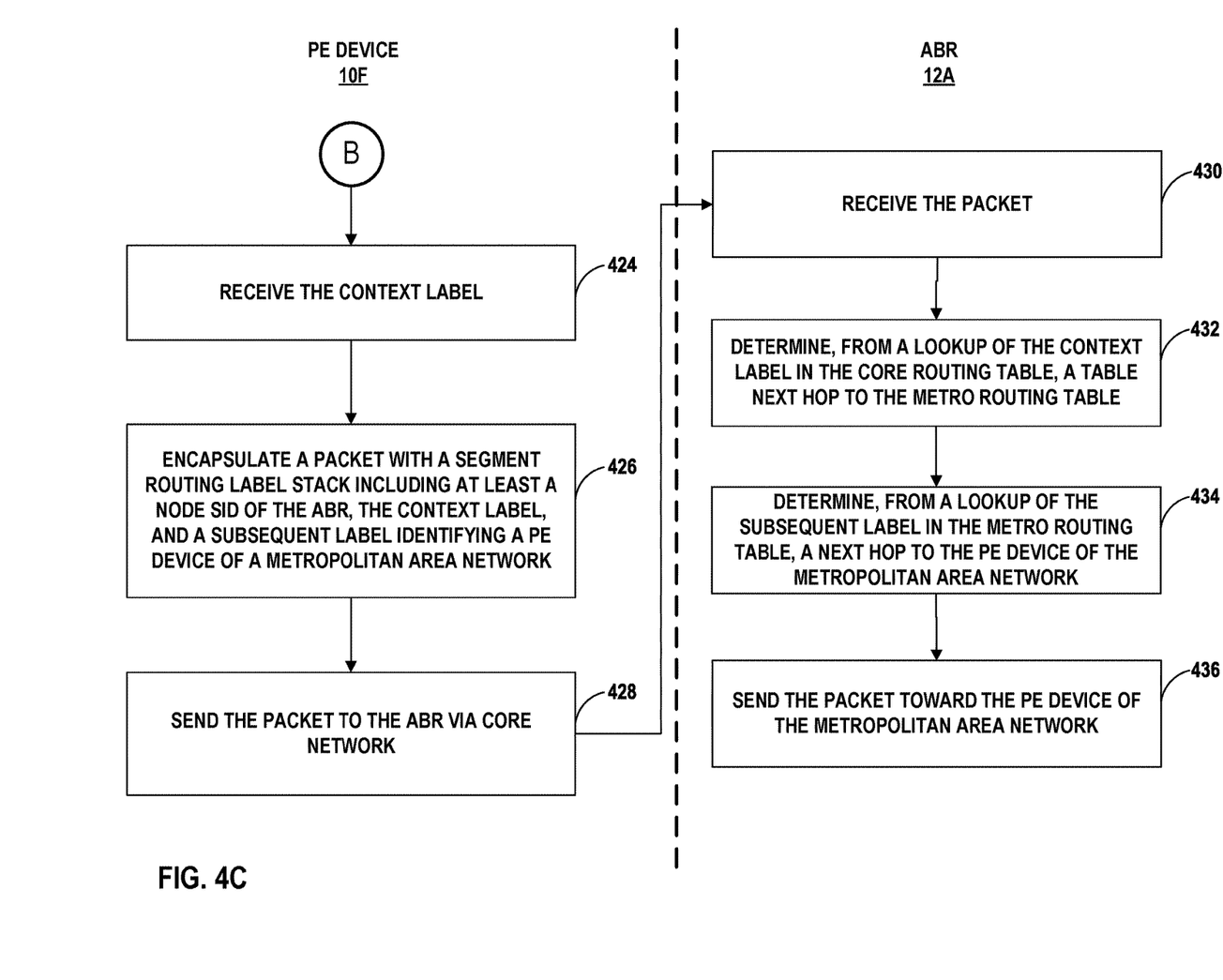

FIGS. 4A-4C are flowcharts illustrating example operations of network devices in network system 2 to provide an end-to-end segment routing path across metropolitan area networks, in accordance with the techniques described in this disclosure.

In the example of FIG. 4A, ABR 12A configures a routing instance for each of a plurality of metropolitan area networks (402). For example, ABR 12A configures a routing instance for metros 6A and 6B connected to ABR 12A. ABR 12A configures a context label for each of the routing instances (404). For example, ABR 12A configures a first context label associated with metro 6A and a second context label associated with metro 6B.

ABR 12A maps the context label for each of the routing instances to a corresponding routing table (406). For example, in core routing table 13A, mpls.0, ABR 12A configures a context label route where the first context label is mapped to the metro routing table 13B (e.g., by using a routing instance identifier as a key), metroA.mpls.0, as a table next hop. Similarly, in metro routing table 13B (e.g., metroA.mpls.0), ABR 12A configures a context label route where the first context label is mapped to the core routing table 13A (e.g., mpls.0), as a table next hop.

ABR 12A advertises the context label for each of the routing instances to network devices of the plurality of metropolitan area networks and the core network (408). As one example, ABR 12A may specify a context label within a sub-TLV of an IS-IS message, within a TLV of an OSPF message, and/or within a TLV of a BGP-LS message, which may be configured similarly to a sub-TLV of an IS-IS message. ABR 12A may advertise the context label to PE devices 10 of metropolitan area networks 6 and/or core device 14. ABR 12A may process packets with a segment routing label stack including at least a label of ABR 12A, a context label associated with a routing instance of the ABR, and a subsequent label identifying a device in the core network or metro (illustrated in FIG. 4A as steps A and B), which is further described in FIGS. 4B and 4C.

In the example of FIG. 4B, PE device 10A receives the context label for each of the routing instances at ABR 12A for use in segment routing (410). When PE device 10A receives a packet from a customer network connected to PE device 10A and destined for a customer network connected to a remote metropolitan area network, e.g., metro 6C, PE device 10A may encapsulate the packet (e.g., packet 22A of FIG. 1) with a segment routing label stack including at least the node SID of the ABR, the context label, and a subsequent label identifying a core router of the core network (412). PE device 10A sends the packet to ABR 12A based on the node SID of ABR 12A being the top label of the segment routing label stack (414).

In response to receiving the packet with the segment routing label stack (416), ABR 12A determines, from a lookup of the context label in the metro routing table 13B, a table next hop to core routing table 13A (418). For example, ABR 12A may, in response to receiving packet 22A with the segment routing label stack including the context label, perform a lookup in metro routing table 13B to determine whether the context label matches an entry in metro routing table 13B. In this example, ABR 12A may determine that the context label matches the context label route with a table next hop to core routing table 13A. ABR 12A then performs a lookup of a subsequent label of the segment routing label stack, e.g., core router 14A of the core network, in the core routing table 13A to determine the next hop in the segment routing path toward core router 14A of segment routing path 20A (420) and sends the packet toward the core router of the core network (422).

In the example of FIG. 4C, a remote PE device, e.g., PE device 10F, receives the context label for each of the routing instances at ABR 12A for use in segment routing (424). PE device 10F may, in some examples, receive a packet from a customer network connected to metro 6C and encapsulates the packet (e.g., packet 22B of FIG. 1) with a segment routing label stack including at least the node SID of the ABR, the context label, and a subsequent label identifying a PE device of a metropolitan area network (426). PE device 10F sends the packet to ABR 12A via core network 8 based on the node SID of ABR 12B being the top label of the segment routing label stack (428).

In response to receiving the packet with the segment routing label stack via core network 8 (430), ABR 12A determines, from a lookup of the context label in the core routing table 13A, a table next hop to metro routing table 13C (432). For example, ABR 12A may, in response to receiving packet 22B with the segment routing label stack including the context label, perform a lookup in core routing table 13A to determine whether the context label matches an entry in core routing table 13A. In this example, ABR 12A may determine that the context label matches the context label route with a table next hop to metro routing table 13B. ABR 12A then performs a lookup of a subsequent label (e.g., node SID of PE device 10C) of the segment routing label stack in the metro routing table 13B to determine the next hop in the segment routing path toward PE device 10A of segment routing path 20B (434) and sends the packet toward the PE device 10A of metro 6A (436).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
receiving, by an area border router (ABR) connected to one or more metropolitan area networks and a core network, a packet including a segment routing label stack for a segment routing path,
wherein the segment routing label stack includes at least a label of the ABR, a context label associated with a routing instance of the ABR, and a subsequent label identifying a device in the core network,
wherein the routing instance of the ABR comprises a metropolitan area network routing table (metro routing table) for a first metropolitan area network of the one or more metropolitan area networks;
determining, from a lookup of the context label in the metro routing table, a table next hop to a core routing table for the core network,
wherein the metro routing table comprises at least one context label route that maps the context label to the core routing table and wherein the core routing table comprises at least one context label route that maps the context label to the metro routing table;
in response to determining the table next hop, determining, from a lookup of the subsequent label in the core routing table, a next hop in the segment routing path to the device in the core network; and
sending, by the ABR, the packet toward the device in the core network.

2. The method of claim 1, further comprising:
advertising, by the ABR and to network devices of the one or more metropolitan area networks and the core network, the context label in a sub-Type, Length, and Value (TLV) of an Intermediate-System to Intermediate-System (IS-IS) message.

3. The method of claim 2, wherein the sub-TLV of the IS-IS message further comprises an instance identifier for the routing instance of the context label.

4. The method of claim 1, further comprising:
advertising, by the ABR and to network devices of the one or more metropolitan area networks and the core network, the context label in a Type, Length, and Value (TLV) of an Open Shortest Path First (OSPF) message.

5. The method of claim 4, wherein the TLV of the OSPF message further comprises an instance identifier for the routing instance of the context label.

6. The method of claim 1, further comprising:
advertising, by the ABR and to a controller for network devices of the one or more metropolitan area networks and the core network, the context label in a sub-Type, Length, and Value (TLV) of Border Gateway Protocol Link State (BGP-LS) message.

7. A method comprising:
receiving, by an area border router (ABR) connected to one or more metropolitan area networks and a core network, a packet including a segment routing label stack for a segment routing path,
wherein the segment routing label stack includes at least a label of the ABR, a context label associated with a routing instance of the ABR, and a subsequent label identifying a device in a first metropolitan area network of the one or more metropolitan area networks,
wherein the routing instance of the ABR comprises a metropolitan area network routing table (metro routing table) for the first metropolitan area network;
determining, from a lookup of the context label in a core routing table for the core network, a table next hop to the metro routing table,
wherein the metro routing table comprises at least one context label route that maps the context label to the core routing table and wherein the core routing table comprises at least one context label route that maps the context label to the metro routing table;
determining, from a lookup of the subsequent label in the metro routing table, a next hop in the segment routing path to the device in the first metropolitan area network; and
sending, by the ABR, the packet toward the device in the first metropolitan area network.

8. The method of claim 7, further comprising:
advertising, by the ABR and to network devices of the one or more metropolitan area networks and the core network, the context label in a sub-Type, Length, and Value (TLV) of an Intermediate-System to Intermediate-System (IS-IS) message.

9. The method of claim 8, wherein the sub-TLV of the IS-IS message further comprises an instance identifier for the routing instance.

10. The method of claim 7, further comprising:
advertising, by the ABR and to network devices of the one or more metropolitan area networks and the core network, the context label in a Type, Length, and Value (TLV) of an Open Shortest Path First (OSPF) message.

11. The method of claim 10, wherein the TLV of the OSPF message further comprises an instance identifier for the routing instance.

12. The method of claim 7, further comprising:
advertising, by the ABR and to a controller for network devices of the one or more metropolitan area networks and the core network, the context label in a sub-Type, Length, and Value (TLV) of Border Gateway Protocol Link State (BGP-LS) message.

13. An area border router (ABR) connected to one or more metropolitan area networks and a core network, the ABR comprising:
   one or more processors operably coupled to a memory, wherein the one or more processors are configured to:
   receive a packet including a segment routing label stack for a segment routing path,
      wherein the segment routing label stack includes at least a label of the ABR, a context label associated with a routing instance of the ABR, and a subsequent label identifying a device in the core network,
      wherein the routing instance of the ABR comprises a metropolitan area network routing table (metro routing table) for a first metropolitan area network of the one or more metropolitan area networks;
   determine, from a lookup of the context label in the metro routing table, a table next hop to a core routing table for the core network,
      wherein the metro routing table comprises at least one context label route that maps the context label to the core routing table and wherein the core routing table comprises at least one context label route that maps the context label to the metro routing table;
   in response to determining the table next hop, determine, from a lookup of the subsequent label in the core routing table, a next hop in the segment routing path to the device in the core network; and
   send the packet toward the device in the core network.

14. The area border router of claim 13, wherein the one or more processors are further configured to:
   advertise, to network devices of the one or more metropolitan area networks and the core network, the context label in a sub-Type, Length, and Value (TLV) of an Intermediate-System to Intermediate-System (IS-IS) message.

15. The area border router of claim 13, wherein the one or more processors are further configured to:
   advertise, to network devices of the one or more metropolitan area networks and the core network, the context label in a Type, Length, and Value (TLV) of an Open Shortest Path First (OSPF) message.

16. The area border router of claim 13, further comprising:
   advertise, to a controller for network devices of the one or more metropolitan area networks and the core network, the context label in a sub-Type, Length, and Value (TLV) of Border Gateway Protocol-Link State (BGP-LS) message.

17. The area border router of claim 13, wherein the packet comprises a first packet, wherein the one or more processors are further configured to:
   receive a second packet including a segment routing label stack for a segment routing path,
      wherein the segment routing label stack includes at least a label of the ABR, the context label associated with the routing instance of the ABR, and a subsequent label identifying a device in the first metropolitan area network of the one or more metropolitan area networks,
      wherein the routing instance of the ABR comprises the metro routing table for the first metropolitan area network;
   determine, from a lookup of the context label in a core routing table for the core network, a table next hop to the metro routing table;
   determine, from a lookup of the subsequent label in the metro routing table, a next hop in the segment routing path to the device in the first metropolitan area network; and
   send the second packet toward the device in the first metropolitan area network.

* * * * *